United States Patent
Fischer et al.

(10) Patent No.: US 6,259,558 B1
(45) Date of Patent: *Jul. 10, 2001

(54) DEVICE FOR THE DIRECTIONAL TRANSMISSION AND THE DIRECTIONAL RECEPTION OF MODULATED LIGHT WAVES

(75) Inventors: Edgar Fischer, Muellheim Dorf; Saverio Sanvido, Glattbrugg; Andreas Herren, Benglen, all of (CH)

(73) Assignee: Contraves Space AG, Zurich (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,269

(22) Filed: Sep. 16, 1998

(30) Foreign Application Priority Data

Dec. 21, 1997 (CH) .................................................. 2930/97

(51) Int. Cl.[7] .................................................. G02B 23/00
(52) U.S. Cl. .......................................... 359/399; 359/429
(58) Field of Search .................................... 359/364, 365, 359/366, 399, 429, 848

(56) References Cited

U.S. PATENT DOCUMENTS

| | | | | |
|---|---|---|---|---|
| H783 | * | 6/1990 | Callender | 359/366 |
| 2,962,925 | * | 12/1960 | Kasson et al. | 359/429 |
| 3,551,022 | * | 12/1970 | Yamasaka et al. | 359/391 |
| 4,439,767 | | 3/1984 | Hefley et al. | |
| 5,076,700 | * | 12/1991 | DeCaprio | 359/848 |
| 5,640,283 | * | 6/1997 | Warren | 359/859 |
| 5,661,610 | * | 8/1997 | Pasternak | 359/859 |
| 5,815,310 | * | 9/1998 | Williamson | 359/365 |

FOREIGN PATENT DOCUMENTS 0 796 829    9/1997    (EP).
2 731 807    9/1996    (FR).

OTHER PUBLICATIONS

Smith et al., *Modern Lens Design*, Optical and Electro–Optical Engineering Series, Section 16.5 "Unobscured Systems"; pp. 296–297 1992.

John M. Senior "Optical Fiber Communications" pp. 468–471.

Eugene Hecht "Optics" pp. 196–198.

* cited by examiner

*Primary Examiner*—Cassandra Spyrou
*Assistant Examiner*—Mark A. Robinson
(74) *Attorney, Agent, or Firm*—Townsend and Townsend and Crew LLP; Guy W. Chambers

(57) ABSTRACT

A device for the directional transmission and the directional reception of modulated light waves between geostationary satellites, or respectively geostationary satellites still close to earth, which have been constructed in a particularly weight-saving manner.

6 Claims, 8 Drawing Sheets

DEVICE FOR THE DIRECTIONAL TRANSMISSION AND THE DIRECTIONAL RECEPTION OF MODULATED LIGHT WAVES

FIELD OF THE INVENTION

The present invention relates to a device for the directional transmission and the directional reception of modulated light waves between geostationary satellites, or respectively geostationary satellites still close to earth by means of a telescope.

BACKGROUND OF THE INVENTION

Fiber-optical communications systems have revolutionized the wire-dependent data transmission over large distances within a few years. In connection with directional radio installations, which had been dominant up to that time, systems already in service today can be considered to be superior in every respect in view of the available bandwidth. Only mobile communications are able to profit indirectly from this advance by means of efficient fixed networks, since cellular networks also need to utilize narrow-band and trouble-prone radio on a portion of the transmission path. In connection with the transmission via or between satellites, large distances still need to be overcome, which absolutely requires large transmission outputs and antennas, which in turn runs counter to the desire for systems as compact and as light as possible for space travel. For this reason efforts were undertaken fairly soon after the triumphal march of the fiber-optical communication technology to also use its advantages for optical communications in free space by means of suitable systems.

New factors in the fiber-optical communications technology, inherent in the system, have shown themselves to be limiting, in particular in connection with bridging great distances, especially the dispersion in the dielectric wave guide used for transmission, and various non-linear effects of its material. Optical communication in free space again meant the return of old limiting effects of radio technology and wire-dependent communications. Here, the loss of signal output on the transmission path and the effects of foreign signals dominated again. However, in fiber-optical communications the extreme limits of the energy of a symbol used for transmission are not expressed by the terms describing the phenomenon of thermal noise, but by means of photons per bit.

For example, at an error quotient of 1/1,000,000,000, 10.5 photons per bit are inherently required for the assured transmission of data by means of intensity modulation (J. S. Senior, "Optical Fiber Communications, Principles and Practice", second edition, Prentice Hall, pp. 469 to 471).

Better results can be achieved with pulse-position modulation, as well as various coherent techniques, in particular methods with homodyne transmission. The best realized results were obtained by means of homodyne superimposition (less than 30 photons per bit). Since there is a clear requirement for low energy consumption for space-based systems, an optical system for data transmission between distant geostationary satellites should transmit and receive light waves by the largest possible and very accurately aligned aperture. This, in turn, can only be realized, starting at a defined size and while maintaining a low weight, in the form of a reflecting telescope. Reflecting telescopes in the so-called coaxial form are known in numerous designs, the systems in accordance with Gregory, Cassegrain and Schmidt should be mentioned (Eugene Hecht, "Optics", second edition, Addison-Wesley Publishing Company, Reading, MA, USA, pp. 197,198).

Common to all of them is the system-related disadvantage of the partial central covering of the aperture by the collecting mirrors and their suspension devices. In this case a compromise between mechanical sturdiness and losses because of covering of the aperture must be found.

Generally, an additional screen is required, which prevents the reflection of scattered light, which is encouraged by the collecting mirror and its suspension, in the direction of the light to be received. The simultaneous use of such a telescope for radiating a light wave as well as for receiving an oppositely entering light wave generally results in significant disadvantages, since the said collecting mirror and its suspension reflects a portion of the high output transmitted light in the direction of the simultaneously entering light wave and results in interferences because of superimposition. Accepting great losses regarding the imaging quality, this problem can be bypassed by the use of an oblique reflecting telescope proposed by Kutter. However, the mentioned imaging errors result in the waste of valuable transmission output.

OBJECT AND SUMMARY OF THE INVENTION

It is therefore the object of the invention, which will be described in what follows, to overcome the mentioned disadvantages of the prior art by employing an oblique reflecting telescope, which is free of imaging errors but permits a simultaneous bidirectional use for transmitting and receiving a light wave.

The said oblique reflecting telescope is constructed from a plurality of mirrors with refractive power and has a surface which provides images in a refraction-limited manner which, in contrast to the system developed by Kutter, have a common optical axis. The characteristic feature of the optical systems lies in that the surfaces of the individual mirrors can be imagined as partial surfaces cut out of the axis-symmetrical mirrors arranged on a common optical axis. Cutting out partial surfaces creates the actual structure of an oblique reflecting telescope, but is also necessary for preventing mutual obscuration and because of the impossibility of the intersection of mirror surfaces.

A further characteristic of the invention lies in the structure of the housing containing the mirrors of the telescope. To the extent necessary for maintaining the imaging quality, the relative position of the mirrors in respect to each other is stabilized by a separate support frame made of Invar or a comparable material. This means can be omitted when using a mechanically and thermally sufficient stable housing.

In accordance with the invention, the housing for the oblique reflecting telescope is made of a particularly light and thermally stable structure. This consists of a honeycomb structure known from aircraft manufacturing, which is closed off at both sides by a material with poor thermal expansion properties. In addition to the proven Invar, the considerably lighter glass-ceramic material Zerodur® has been used for the first time in the present invention for these layers which, compared with Invar, in addition shows considerably less thermal expansion. Furthermore, a plastic material was used for the first time for the same purpose. It is a very temperature-resistant thermoplastic material (Peak), which is mixed with a large proportion of stabilizing fiberglass sections, which see to sufficient mechanical and thermal stability.

In addition, the housing for the telescope is designed in such a way that a screen, which is not as urgently necessary because of the lack of a collecting mirror, has already been integrated over a relatively short length.

An essential advantage of the invention lies in the low weight of the telescope, which is seated so it is rotatable around one or several axes, in particular when it is possible to omit a supporting frame inside of the housing because of the advantageous static properties of the housing, which has been assembled for reasons of weight saving from the plates manufactured in the sandwich structure with the aluminum honeycomb mentioned, which is possible in particular if, in accordance with a further characteristic of the invention, the mass of the mirror body used has been reduced to a minimum, determined by the strength requirements, by recesses made by means of bores on its side facing away from the light.

Because of the employment of an oblique reflecting telescope, which provides error-free images, a further advantage lies in that it is possible, corresponding to telescopes which mainly operate with lenses, to use more than two mirrors with refractive power, by means of which it is possible to transfer the advantages, which can be achieved with refractive systems completely equipped with lenses, to optical systems equipped with mirrors.

Further details, characteristics and advantages of the invention result not only from the claims and characteristics which can be taken from them, either individually or in but also from the following description of preferred exemplary embodiments.

DETAILED DESCRIPTION OF THE PREFERRED EMBODIMENTS

Figure 1A:
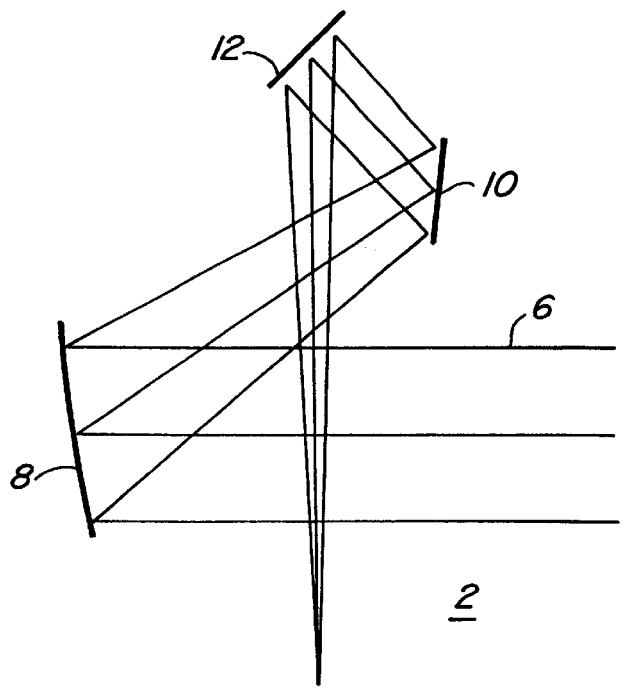
FIG. 1 presents two schematic sketches of different embodiments of oblique reflecting telescope
Figure 1B:
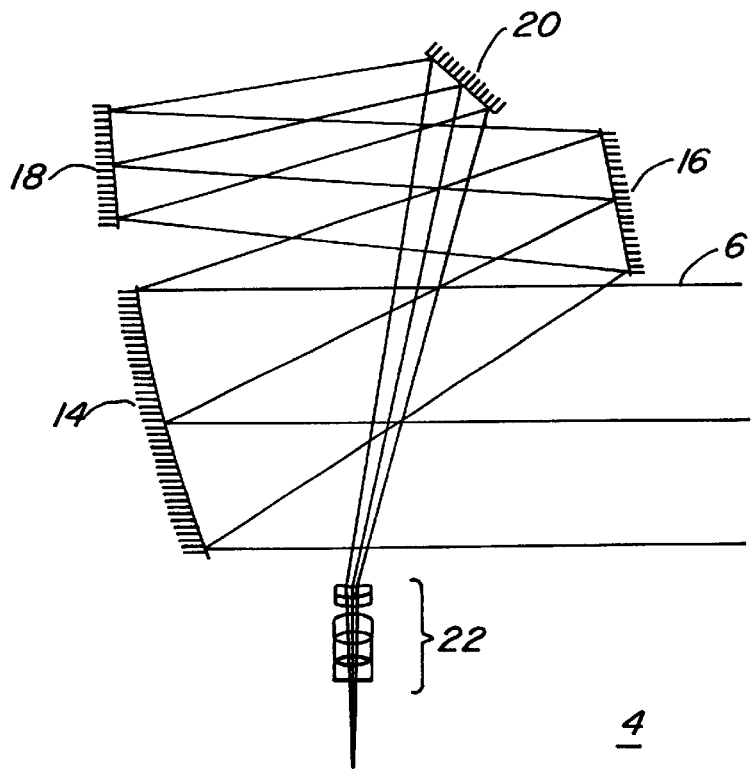
Figure 2A:
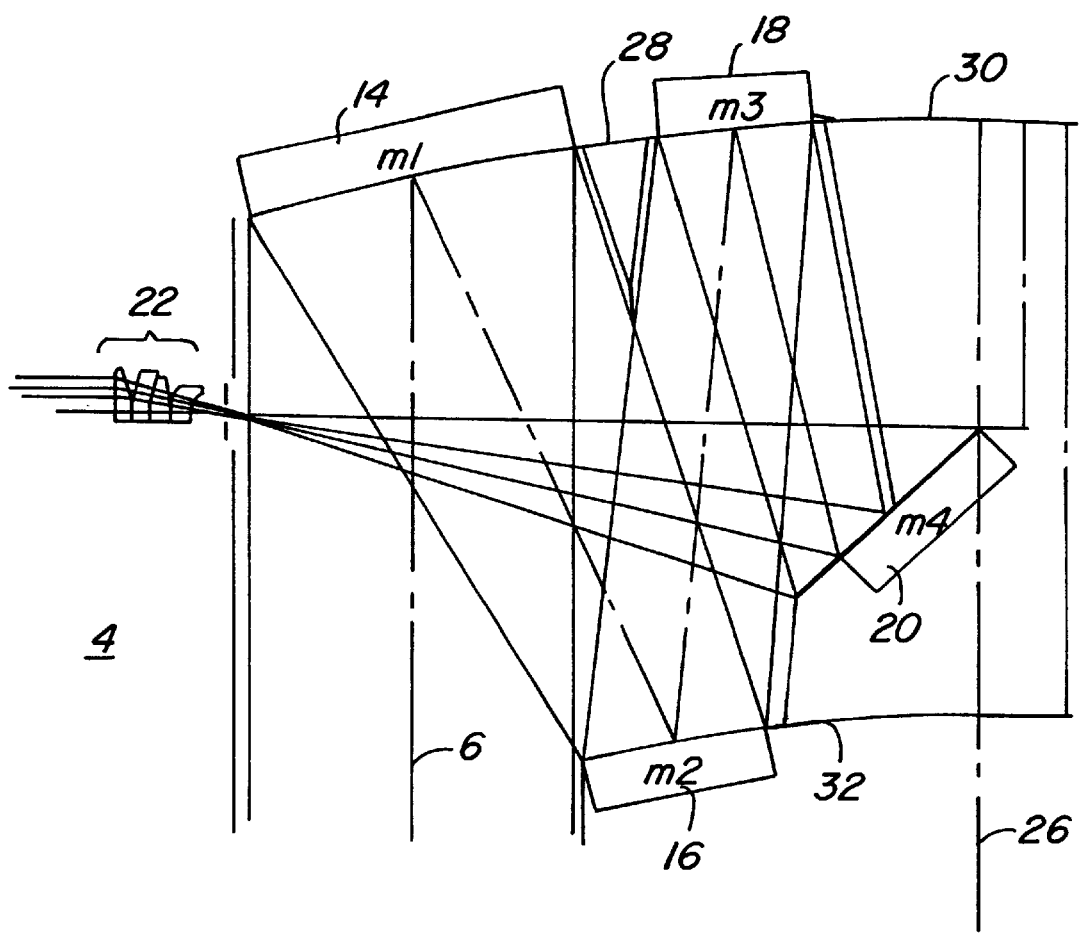
FIG. 2 shows the special optical construction of the oblique reflecting telescope used.
Figure 2B:
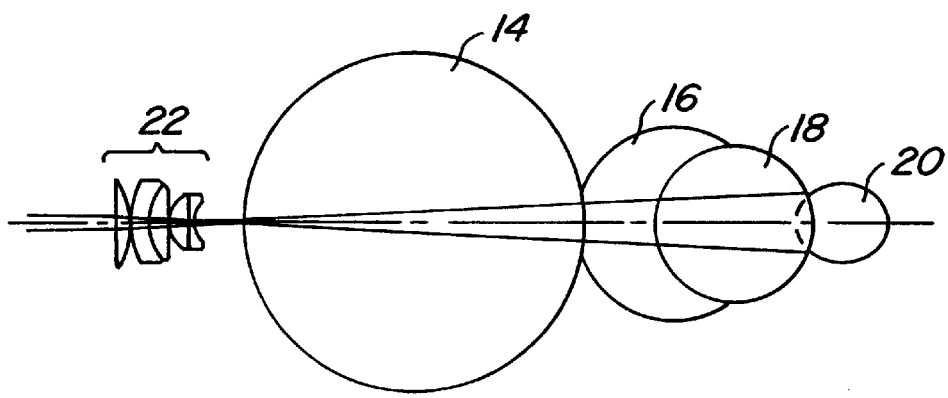

FIG. 1 shows the form of an oblique reflecting telescope 2 developed by Kutter, which consists of mirrors 8 and 10 with refractive power, which are laterally offset from each other in respect to the incident light beam 6, and of a flat deflecting mirror 12. The mirrors 8 and 10 generally have optical axes which are not parallel with the incident light beam 6. This necessarily results in imaging errors with an increased deviation from the optical axis. This defect is removed by means of an improved construction 4, in that all mirrors with refractive power 14, 16 and 18 have a common optical axis 26(see FIG. 2), which is parallel in respect to the incident light beam 6 as well as to each other. Thus the said mirrors are sections of dynamically balanced mirror surfaces which cover and intersect each other and have a common axis of symmetry, which can be seen even more clearly by means of their extension 28, 30 and 32 shown in sagittal section in FIG. 2.As illustrated in the drawings, all the mirrors used in the present invention are preferably aperture-free.

Figure 3B:
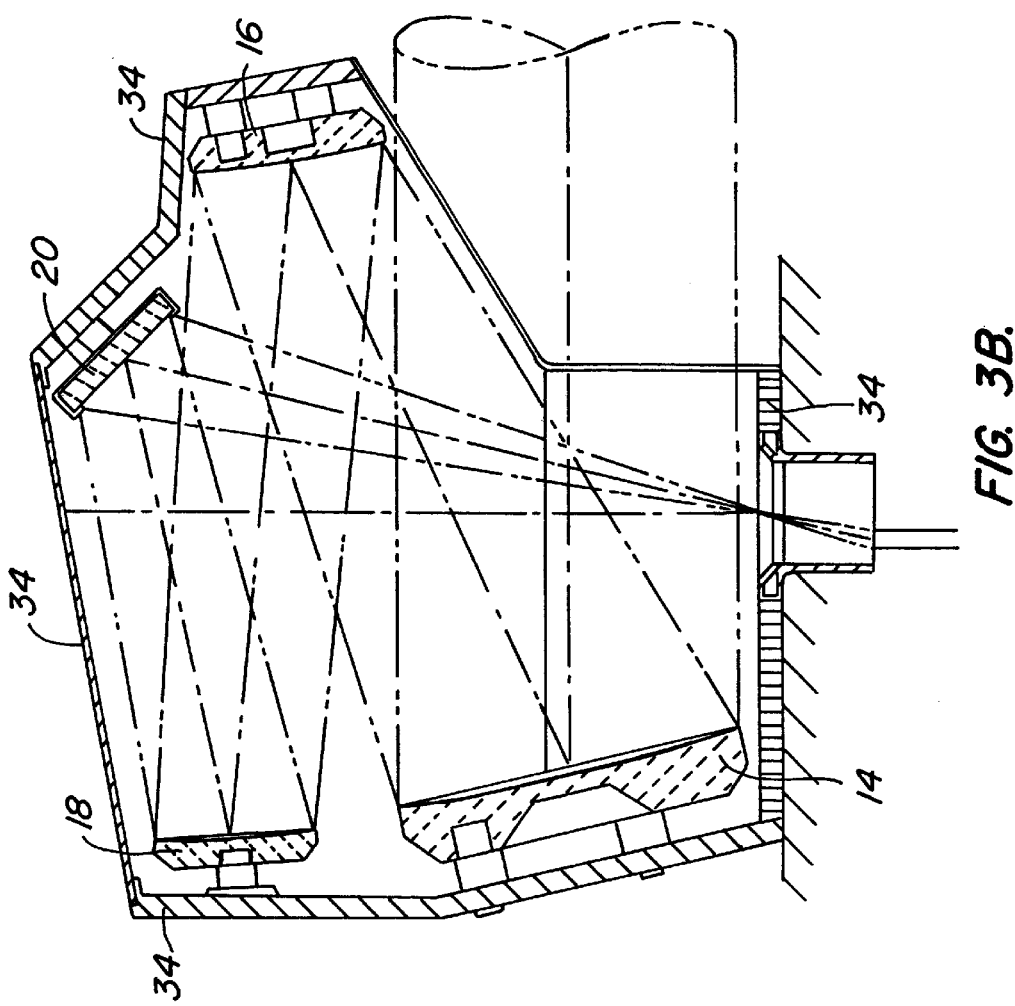
FIG. 3 represents a cross section as well as a sagittal section through a lightweight support housing containing the oblique reflecting telescope.
Figure 3A:
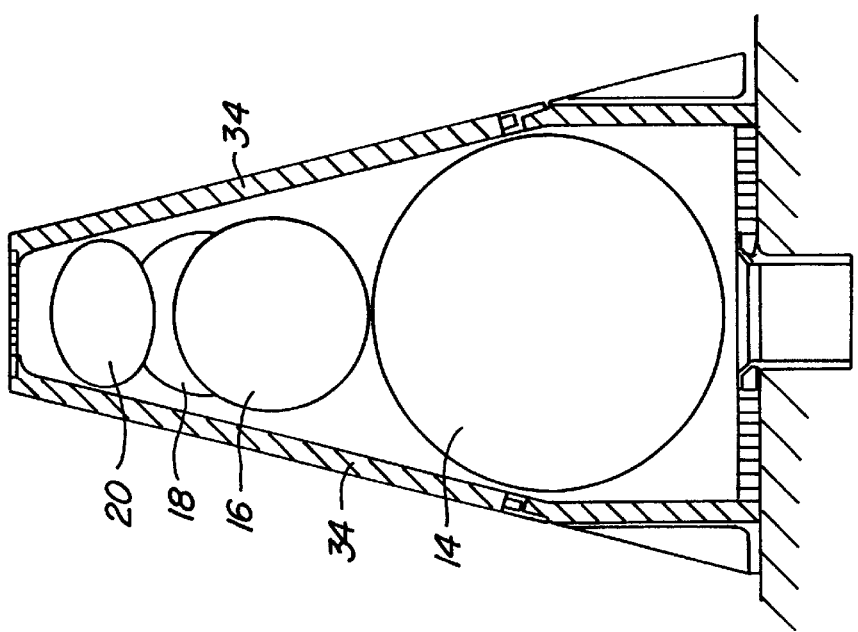

A planar mirror 20 sends the light beam 6 into a refractive optical device 22, which in general is followed by an optical bench containing appropriate quantum-optical devices. For the purpose of screening out light being scattered in laterally, the mirrors 14, 16, 18 and 20 have been placed into a housing in accordance with FIG. 3, which is put together of plates 34 of different thickness.

Figure 5:
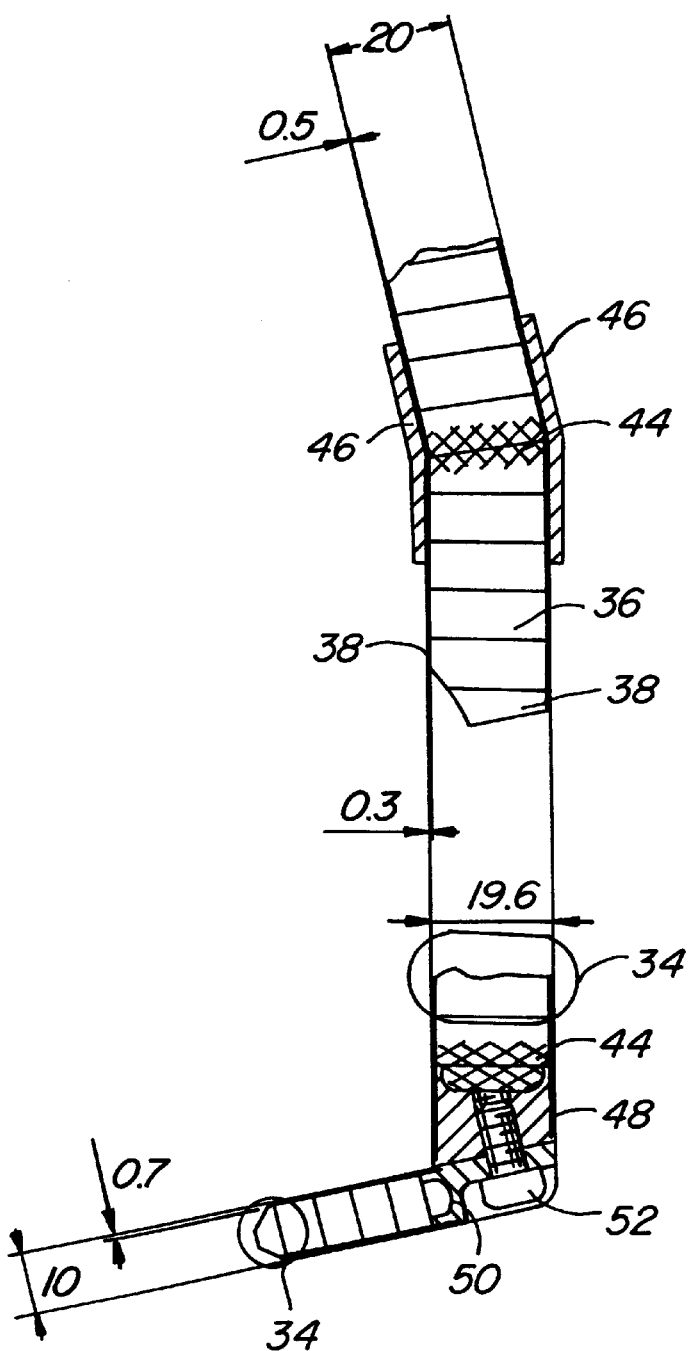
FIG. 5 represents two embodiments of obtuse-angled connections between the segments of the lightweight housing used.

As represented in FIG. 5, in an embodiment known from aircraft manufacturing, the plates 34 are made of a hexagonal honeycomb-like structure 36, which is located between two thin layers 38 and is connected with them by gluing or other techniques. While the honeycomb-like structure 36 can be made of aluminum, materials showing little thermal expansion are provided for the thin layers 38. Besides proven materials, for example Invar, these can also be other suitable materials, such as Zerodur® which, besides even less thermal expansion, also results in considerable weight savings.

Besides the glass-ceramic material Zerodur®, plastic materials can also be used. Thermoplastic materials make simpler processing possible and, with an appropriately high processing temperature, can also be employed at even higher temperatures. Materials modified by the admixture of fiber-glass sections meet both mechanical and thermal requirements for use in space. Therefore thermal expansion is extremely low, temperature resistance and mechanical stability are sufficient. The property of little thermal expansion can be particularly optimized in that a large proportion of fiberglass sections or fiber sections of other materials is admixed to the plastic material, wherein the glass or other material used for the fiber sections has the lowest thermal expansion.

Figure 4B:
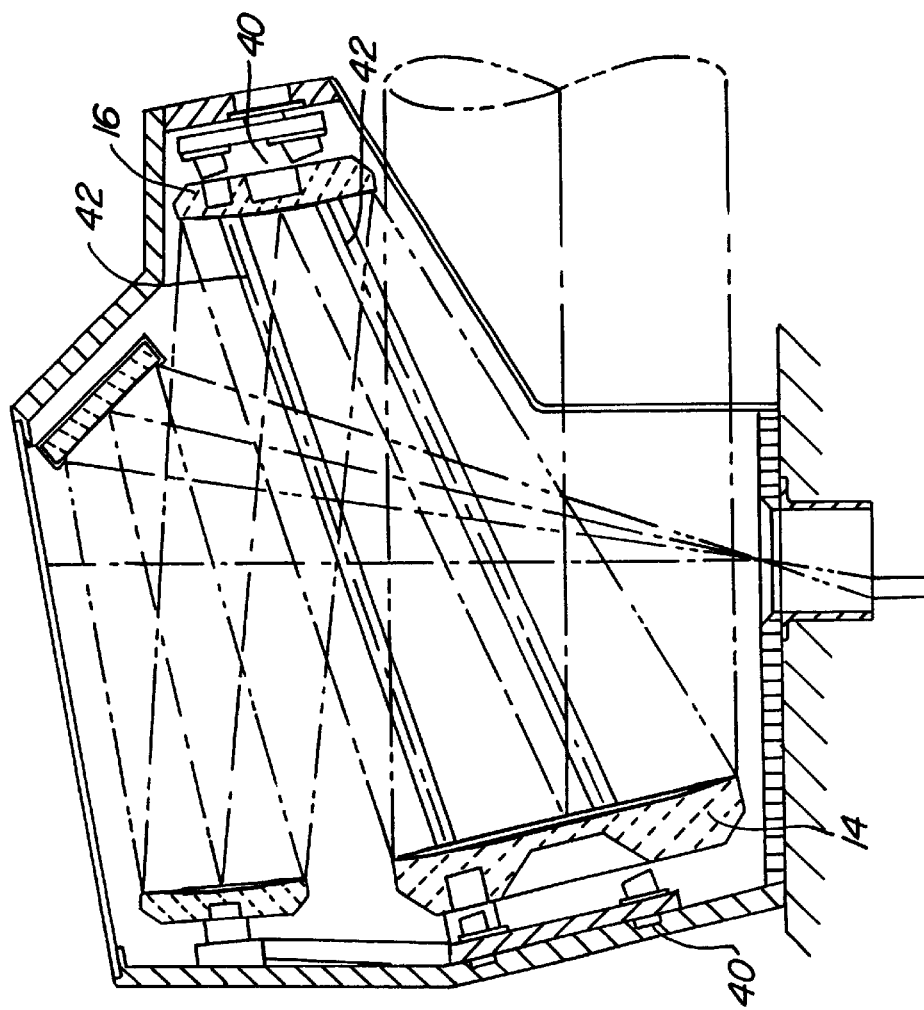
FIG. 4 represents a cross section as well as a sagittal section through a lightweight support housing containing the oblique reflecting telescope, including a stabilizing support frame.
Figure 4A:
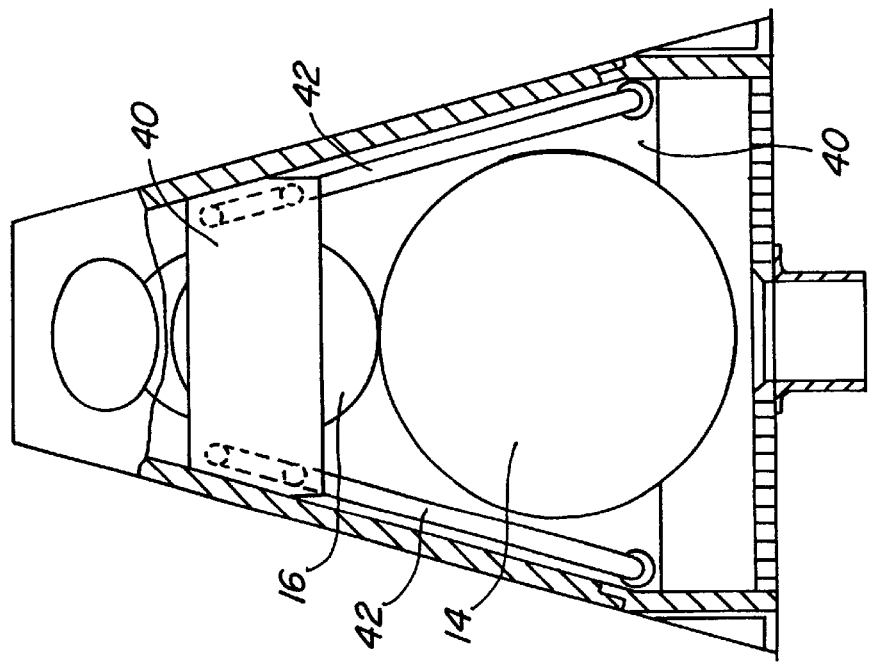

In addition, fiberglass or fibers made of other materials can be present within a thin layer 38 in the form of a matrix structure. In order to keep the mass of the mirrors 14, 16, 18 and 20 as well as further mirrors as low a possible, they can be provided on their side facing away from the light with a plurality of bores, not necessarily required for fastening them on the housing, which in a regular embodiment approximately result in recesses of also hexagonal honeycomb-like structure. Since keeping the relative position of the mirrors 14 and 16 in respect to each other is very critical for the quality of the optical image, maintaining them exactly can be additionally assured in accordance with FIG. 4 by supporting plates 40 and struts 42 made of a material of low heat expansion. Obtuse-angled connections between plates 34 are represented in FIG. 5.

On the one hand, the connection between two plates can take place in a final manner by an adhesive connection 44 at respective appropriately beveled plate edges, which is provided with additional stability by glued-on support material 46. On the other hand, a connection can also be provided by means of an adhesive contact 44 between a rail 48, which is provided with threaded holes at defined distances, and the plate 34, wherein a corresponding rail 50, which is provided with holes and glued together with the second plate 34 to be connected, is fastened on the rail 48 by means of threaded screws 52.

Figure 6:
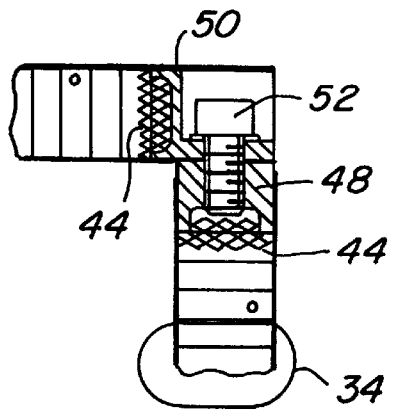
FIG. 6 represents an embodiment of a right-angled connection between the segments of the lightweight housing used.
Figure 7:
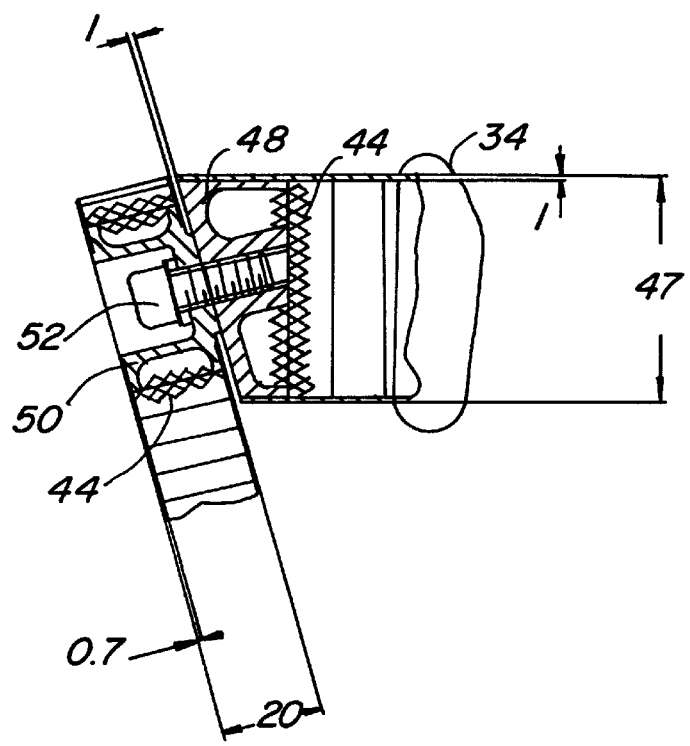
FIG. 7 represents an embodiment of an acute-angled connection between the segments of the lightweight housing used.
Figure 8:
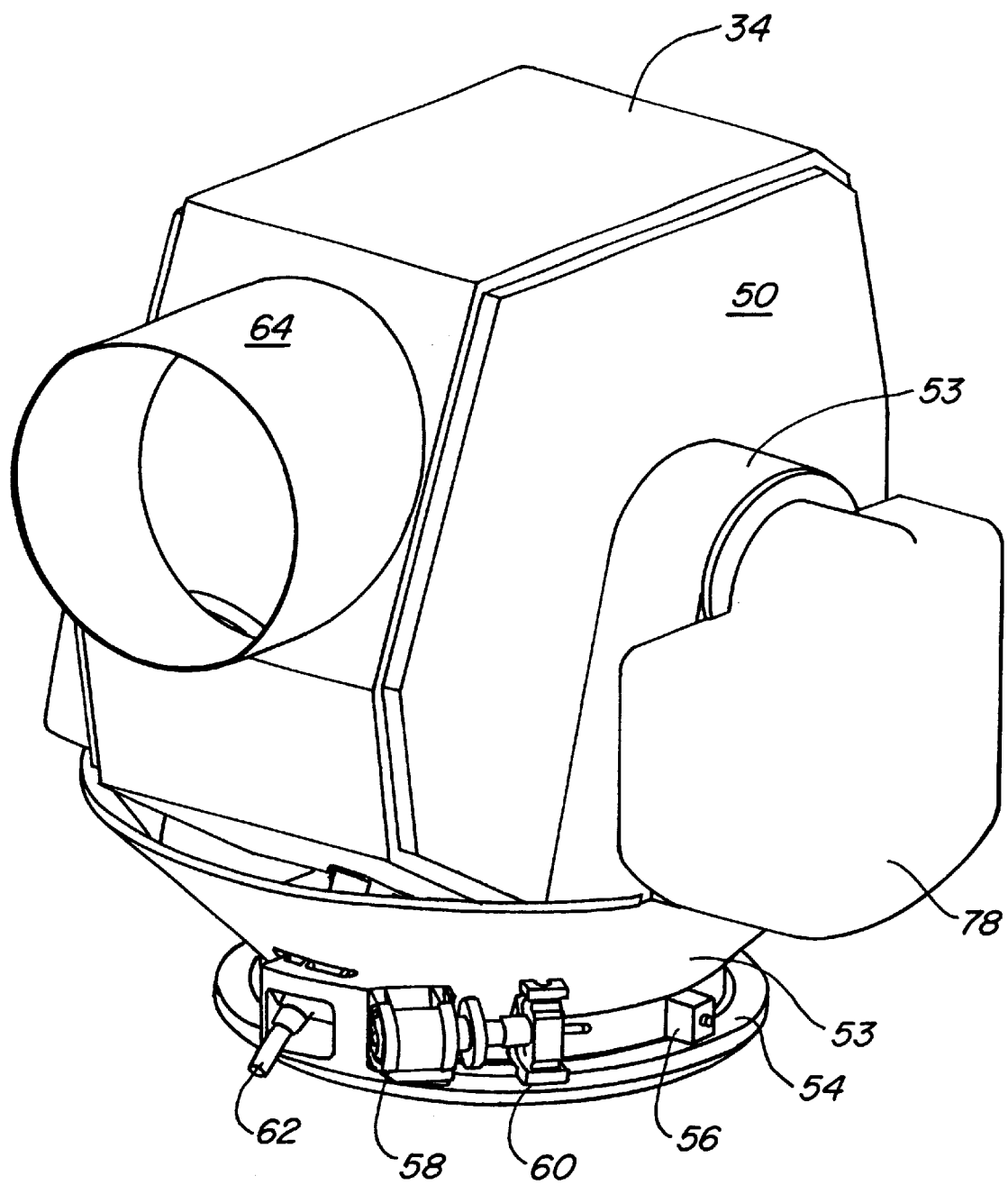
FIG. 8 represents an exterior view of an optical front end of an optical communication system containing an oblique reflecting telescope.
Figure 9:
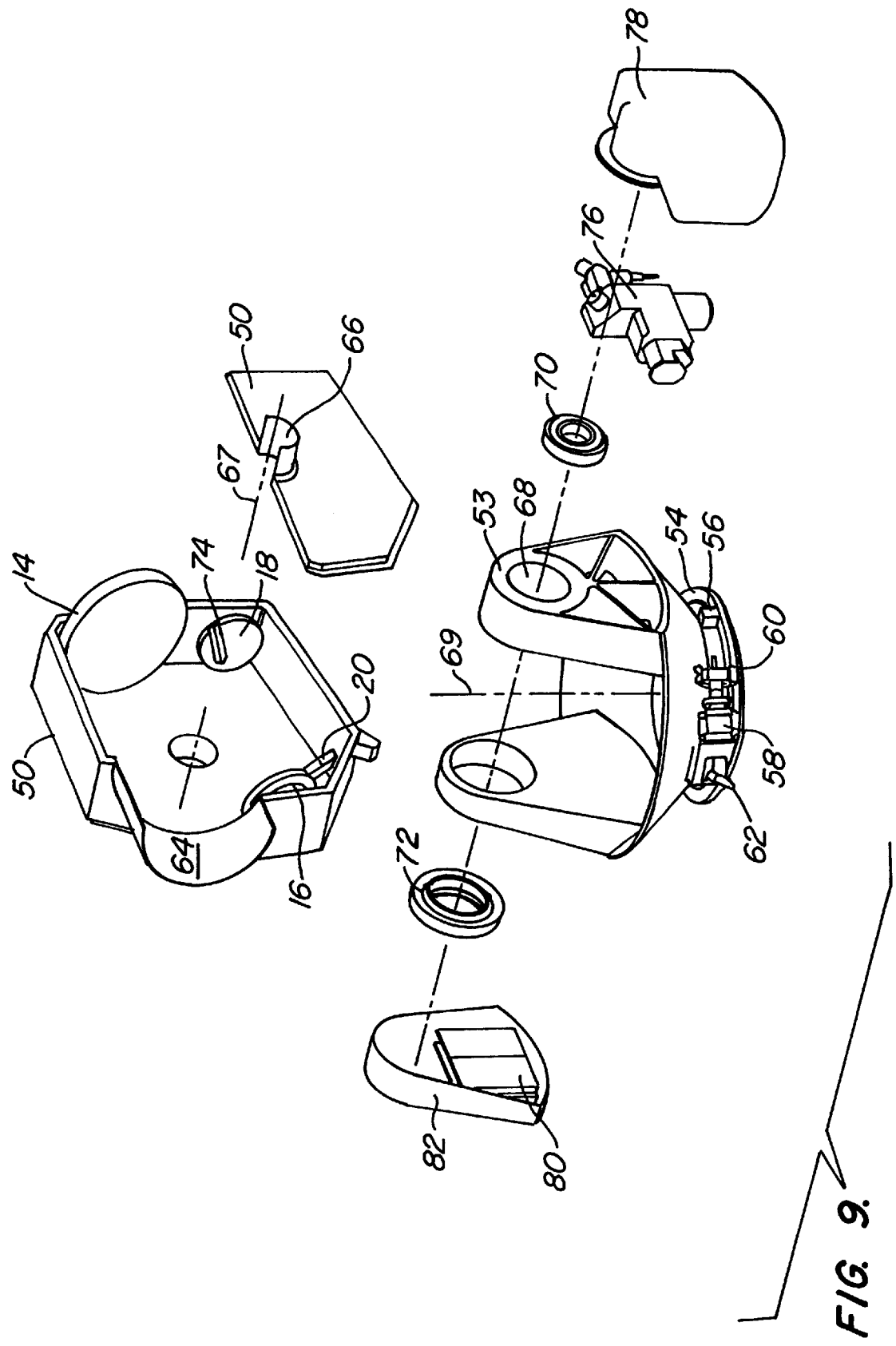
FIG. 9 is an exploded view of the optical front end.

FIGS. 6 and 7 represent a corresponding right-angled, or respectively acute-angled connection. The integration of an oblique reflecting telescope of the type described by means of FIG. 3 and FIG. 4 within a front end of an optical free space optical communications system is represented in FIGS. 8 and 9. The housing 50 put together from plates 34 is seated in a yoke 53, which is rotatably seated in a ring 54. An angle encoder 56 for determining the actually set angle of rotation around an azimuth axis 69, a motor 58 acting on the ring 54 via a gear 60, as well as a lock 62, intended for the rest phases and blocking all rotary movements, are fixed on the ring 64. The lock 62 is used for securing the entire device when used in a satellite, which is subjeted to extreme acceleration during the start of the rocket. In addition, a screen 64, which acts in addition to the housing 50, has been attached to the housing 50. The telescope can be turned around the elevation axis by means of hollow pins 66 attached to the housing 50, while simultaneously light is coupled in, respectively conducted out of the telescope through the interior of one of the two hollow pins 66 by means of a flat deflecting mirror 74. The devices necessary for this are combined in an optical bench 76, which is fastened on the yoke 52 next to this hollow pin 66. This screening cover 78 takes up heat generated by the optical bench 76 and radiates it into free space. A further cover 82, which screens and cools components 80 of the electronic device close to the system, serves the same purpose. Furthermore, a drive 72 acting on the second hollow pin 66 for setting the elevation angle of the telescope rotated around an elevation axis 67, as well as a measuring sensor 70 for its detection, are oppositely located in the other arm of the yoke 52 and attached to the yoke. The measuring sensor 70 consists of two rings which can be moved in respect to each other and are in fixed contact with respectively the hollow pin 68 or the yoke 53, wherein the opening of the yoke 66 is in no case completely covered so as to make possible the entry, or respectively exit of light via the deflecting mirror 74. The measuring sensor 70 and the drive 72 are used as sensor, or respectively actuator for a control circuit arranged in the component 80 in the vicinity of the system. Further modules arranged in the component 80 close to the system control the temperature of a quantum-optical amplifier as well as the fine alignment and the amount of lead for the light beam to be transmitted.

The optical bench 76 is fastened to the yoke 53 and is rotated azimuthally along with it, while a change in the transmitting, or respectively receiving direction in elevation takes place by rotating the deflecting mirror 74 along with the telescope being rotated in elevation which, in view of the use of circularly polarized light for the transmission, does not require the adaptation of a linear polarization direction. This represents an advantageous compromise for the special case of employment of the connection between two satellites located in geostationary orbit, since by means of the change of the elevation angle of the telescope located in the housing 50 it is possible to reach a large number of neighboring satellites, wherein only slight adaptations of the azimuth angle set by means of the motor 58 via the gear 60, as well as the angle encoder 56 are required. If therefore the actuation range of the latter is limited as a whole to less than 10 degrees, no special cable connection, which is capable of being rotated, of the electronic device required for operation is required from the body of a satellite to the optical bench 76, or to components 80 in the vicinity of the system.

What is claimed is:

1. A device for the directional transmission and/or reception of modulated light waves comprising a housing which is made of plates with a honeycomb structure enclosed by thin layers with low thermal expansion properties and an oblique reflecting telescope within said housing having a plurality of aperture-free mirrors arranged on a common optical axis, wherein said housing is seated in a symmetrically constructed yoke.

2. The device in accordance with claim 1 further comprising a screen attached to said housing.

3. The device in accordance with claim 1, wherein said mirrors are provided on a side of the housing facing away from the light.

4. The device in accordance with claim 1, wherein said oblique reflecting telescope contains at least three mirrors with refractive power.

5. The device in accordance with claim 1, further comprising an optical bench firmly connected with the yoke.

6. The device in accordance with claim 1 wherein said mirrors are constructed with a honeycomb-like structure.

* * * * *